United States Patent
Orlassino

(10) Patent No.: US 8,478,265 B2
(45) Date of Patent: Jul. 2, 2013

(54) SYSTEM AND METHOD FOR ADAPTIVE/PREDICTIVE LOCATION-BASED ROAMING OPTIMIZATION

(75) Inventor: Mark Orlassino, Centereach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1301 days.

(21) Appl. No.: 11/864,367

(22) Filed: Sep. 28, 2007

(65) Prior Publication Data

US 2009/0088152 A1    Apr. 2, 2009

(51) Int. Cl.
*H04W 8/06* (2009.01)
*H04W 36/30* (2009.01)

(52) U.S. Cl.
USPC ..................................... 455/432.1; 455/436

(58) Field of Classification Search
USPC .............. 455/436, 432.1, 434, 443, 507, 440, 455/456.5, 456.1, 524; 370/331, 328, 338, 370/431, 329; 726/23
See application file for complete search history.

(56) References Cited

U.S. PATENT DOCUMENTS

| | | | |
|---|---|---|---|
| 2004/0043767 A1* | 3/2004 | Tsutsumi et al. | 455/432.1 |
| 2007/0025293 A1* | 2/2007 | Choi | 370/331 |
| 2007/0142050 A1* | 6/2007 | Handforth et al. | 455/436 |
| 2008/0075035 A1* | 3/2008 | Eichenberger | 370/328 |
| 2008/0293405 A1* | 11/2008 | Meyer | 455/432.1 |
| 2009/0080381 A1* | 3/2009 | Yashar et al. | 370/331 |

\* cited by examiner

*Primary Examiner* — Kiet Doan

(57) ABSTRACT

Described is a method including collecting roaming data for a network. The method further includes creating a scan list based on the roaming data, wherein the scan list including a prioritization of a plurality of access points for roaming. The method further includes transmitting the scan list to a mobile unit. Further described in a system including a collection module collecting roaming data for a network. The system further includes a creation module creating a scan list based on the roaming data, the scan list including a prioritization of a plurality of access points for roaming. The system further includes a transmitter transmitting the scan list to a mobile unit.

22 Claims, 4 Drawing Sheets

| Target AP* | Target AP Priority | Handoff Weight |
|---|---|---|
| AP 20 | 1 | 56 |
| AP 40 | 2 | 39 |
| AP 30 | 3 | 12 |
| AP 50 | 4 | 1 |

* Current AP is AP 10
* Priorty: 1 is the highest and 4 is the lowest

SYSTEM AND METHOD FOR ADAPTIVE/PREDICTIVE LOCATION-BASED ROAMING OPTIMIZATION

FIELD OF THE INVENTION

The present invention relates to a system and method for adaptive/predictive location-based roaming optimization. In particular, the present invention relates to using roaming data of a mobile unit as that mobile unit roams between access points.

BACKGROUND

When a mobile unit (MU) terminates communication with a first access point (AP) and initiates communication with a second AP, it is commonly referred to as a roam. The MU scans all available radio frequency channels to find an AP that is providing a highest signal strength. The MU performs an association/authentication handshake and begins transmitting/receiving packets with the selected AP. The time it takes the MU to scan and associate with the selected AP may be problematic if the MU was conducting a voice application (e.g., mobile phone, walkie-talkie) when the roam occurred. The roam may cause the MU to drop voice packets or the call because the wireless connection is being transferred to the selected AP.

SUMMARY OF THE INVENTION

The present invention relates to a method including collecting roaming data for a network, creating a scan list based on the roaming data, the scan list including a prioritization of a plurality of access points for roaming, and transmitting the scan list to a mobile unit.

The present invention further relates to a system including a collection module collecting roaming data for a network, a creation module creating a scan list based on the roaming data, the scan list including a prioritization of a plurality of access points for roaming, and a transmitter transmitting the scan list to a mobile unit.

The present invention further relates to a system including a collection means for collecting roaming data for a network, a creation means for creating a scan list based on the roaming data, the scan list including a prioritization of a plurality of access points for roaming, and a transmittal means transmitting the scan list to a mobile unit.

The present invention further relates to a system including a plurality of mobile units, and a plurality of access points, each access point collecting roaming data as the plurality of mobile units roam from each access point to others of the access points, each access point creating a prioritized scan list based on the roaming data, and each access point sending the prioritized scan list to each mobile unit located within a coverage area of the access point

DETAILED DESCRIPTION

Figure 1:
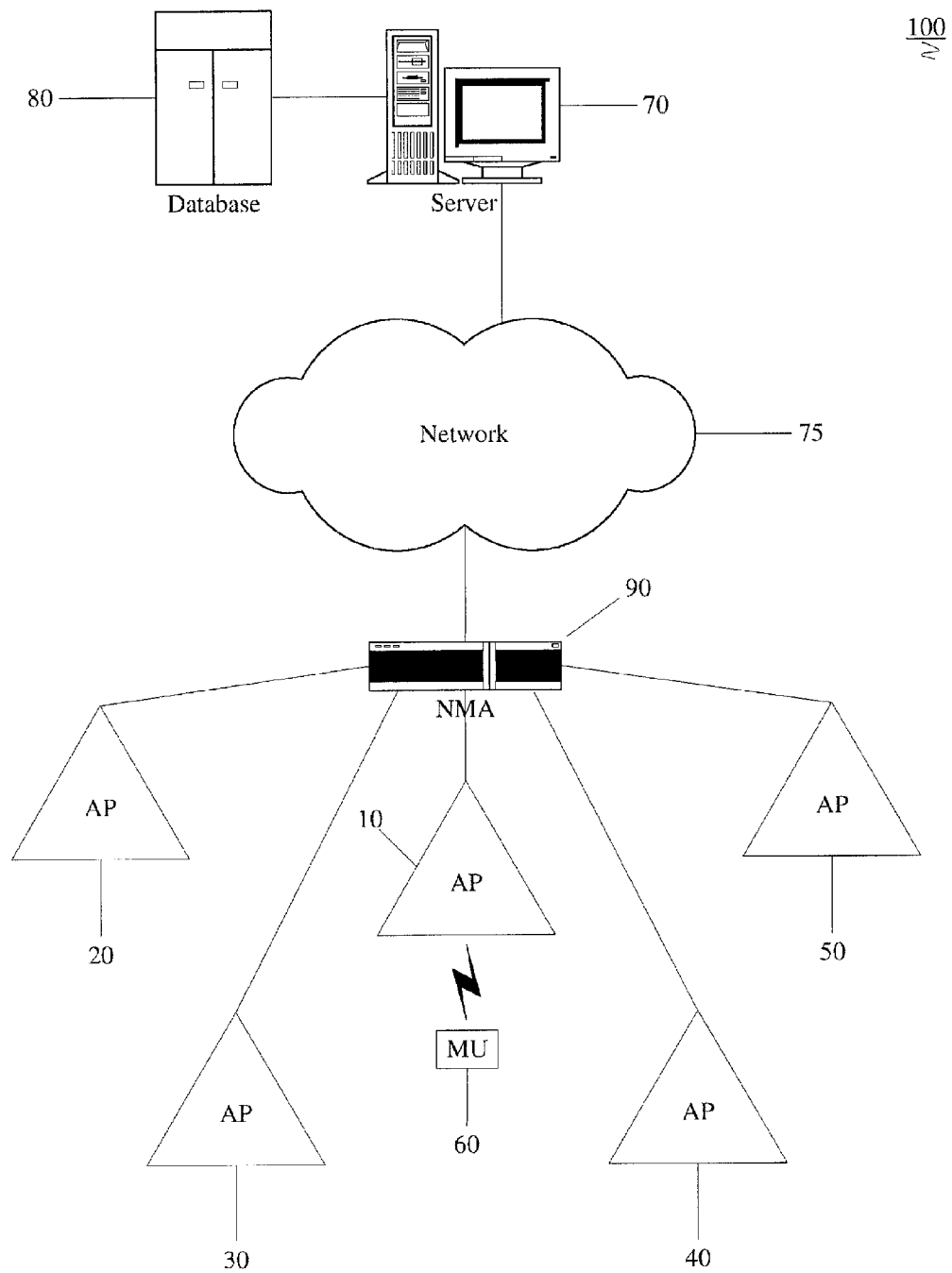
FIG. 1 shows an exemplary system of an access point with neighboring access points according to the present invention.

The present invention may be further understood with reference to the following description and the appended drawings, wherein like elements are referred to with the same reference numerals. The exemplary embodiment of the present invention describes a method for adaptively scanning available access points when a mobile unit roams from one access point to another access point.

A wireless communication network incorporates access points (AP) to extend a coverage area so that a mobile unit (MU) may connect to the network in a greater number of locations. The APs contain an individual coverage area that is a part of the coverage area of the network. Once the MU is connected to an AP, the MU may travel within the coverage area of the AP. As the MU exits the coverage area of the AP, the MU may have to connect to a neighboring AP to maintain the connection to the network (i.e., roam). The time necessary to switch from one AP to another AP may determine the continuity of the MU maintaining the connection to the network. It should be noted that the exemplary embodiments of the present invention may be implemented within any wireless network architecture, such as, for example, as a wireless local area network ("WLAN"), a wireless personal area network ("WPAN") (e.g., Bluetooth, ZigBee), etc.

FIG. 1 shows a system 100 which includes access points 10-50 according to an exemplary embodiment of the present invention. A server 70 may be connected to a network 75. The server 70 may further be connected to a database 80. A network management arrangement (NMA) 90 may be connected to the network 75. APs 10-50 may be connected to the NMA 90. Those skilled in the art will understand that each of the APs 10-50 may be connected to a different NMA, may operate under the same NMA 90, or the system may not include an NMA. An MU 60 is communicating with the AP 10 and may roam to the coverage areas of any of the APs 20-50. It should be noted that the system shown in FIG. 1 is only exemplary and there may be fewer or more APs and the MU 60 may be initially communicating with any of the APs 10-50. In the exemplary embodiment, each of the APs 20-50 includes a coverage area that may overlap or be adjacent to the coverage area of the AP 10. Thus, when the MU 60 roams from the AP 10, it may enter the coverage area of any of the APs 20-50.

In one exemplary embodiment, each of the APs 10-50 includes a memory that stores roaming data that may be used by mobile units (e.g., MU 60). In another exemplary embodiment, the roaming data may be stored in the database 80 or in the NMA 90. All components of the system 100 that are connected to the network may access the roaming data that is stored via the network 75. Thus, before the MU 60 traverses the coverage area of AP 10 into a coverage area of another AP (e.g., APs 20-50), the roaming data may be used by the MU 60 to efficiently transfer connection (i.e., associate) from the AP 10 to one of the APs 20-50 using an adaptive transfer method. The association method using the adaptive transfer method will be discussed in detail below with reference to FIG. 2. Furthermore, the roaming data may be prepared prior to the MU 60 exiting a coverage area of the AP 10 using conventional locating methods (e.g., GPS, triangulation, time difference of arrival (TDOA), received signal strength indicator (RSSI), etc.). It should be noted that a common file stored in the database 80 or the NMA 90 accessible by the APs would alleviate the need for multiple copies of roaming data.

In a first embodiment, the roaming data may be a counter statistic that tracks when MUs roam from one AP (e.g., AP 10) to another AP (e.g., one of APs 20-50). This is referred to as a "handoff history" (i.e., number of times an association/authentication handshake takes place from one AP to another AP in the network). This roaming data may be collected for the handoff history of the entire network. For example, the handoff history between AP 10 and AP 20 may include the total number of times that MUs roamed from AP 10 to AP 20. In another embodiment, the roaming data may be a handoff history for a particular MU. For example, the roaming data may be the handoff history of the MU 60 traversing the coverage area of the AP 10 to the coverage areas of other APs (e.g., APs 20-50). The roaming data may be stored and updated in a variety of manners. In a first example, an overall figure may be used that records a handoff history since an MU was activated (where the roaming data is collected on an MU basis) or since each AP was activated (where the roaming data is collected on a network or AP basis). In other examples, the handoff history may be separated by time of year (e.g., months, seasons, etc.) or time of day (e.g., morning, afternoon, etc.).

Figures 3, 5:
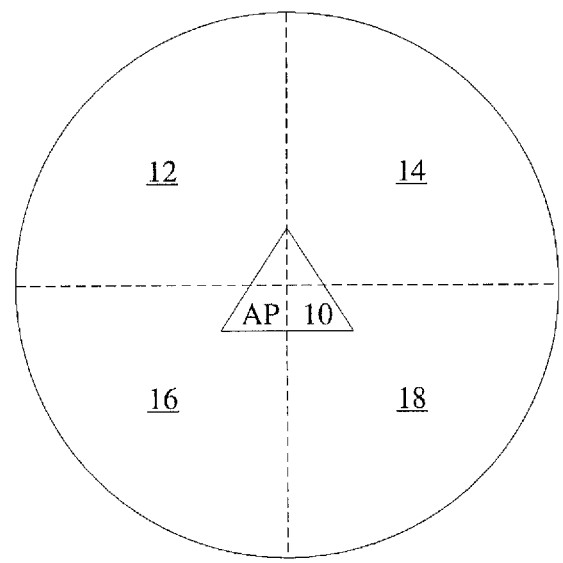
FIG. 3 shows an exemplary sector map for a coverage area of an access point according to the present invention.
FIG. 5 shows an exemplary scan order of the handoff history of FIG. 4.

In a further embodiment, the roaming data generated using the handoff history may be supplemented using other data such as signal strength (RSSI). As will be described in greater detail below, the roaming data will be used to create a scan list of APs for an MU when the MU needs to roam. The supplemental data (e.g., RSSI data) may be used to modify the scan order determined based on the handoff history alone. For example, based on the handoff history alone, the scan list for the MU 60 leaving the coverage area of AP 10 may be AP 20, AP 50, AP 30, and AP 40. However, the MU 60 may measure the RSSI of each of the APs 20-50 and modify the scan list by using the supplemental data (e.g., RSSI data). For example, the signal received from AP 40 may have a RSSI that is 50% greater than the RSSI of the signal received from the AP 30. Thus, the MU may modify the scan list to include the channel for the AP 40 prior to the AP 30. It should also be noted that this supplemental data may be a combination of currently measured data (e.g., RSSI data, location data) and stored data. For example, the roaming data may include a more detailed map of an AP coverage area and the handoffs that occurred from various locations in the coverage areas. In one example, as shown in FIG. 3, the coverage area of the AP 10 may be divided into sectors 12-18. The AP 10 may store the handoff history on a sector by sector basis. Thus, if the MU 60 is in the sector 14 (as determined by known locating techniques such as GPS, triangulation, etc.), the roaming data associated with the sector 14 may be provided to the MU 60. This roaming data may be different from the roaming data for the sector 16 of the same AP 10. Thus, the roaming data generated by the handoff history may be supplemented by other stored or real time data. All of this data either singularly or collectively may be referred to as roaming data herein. It should be noted that the roaming data may include apriori data. Furthermore, the creation of the scan list may include the use of an apriori algorithm as a function of the roaming data.

Figure 2:
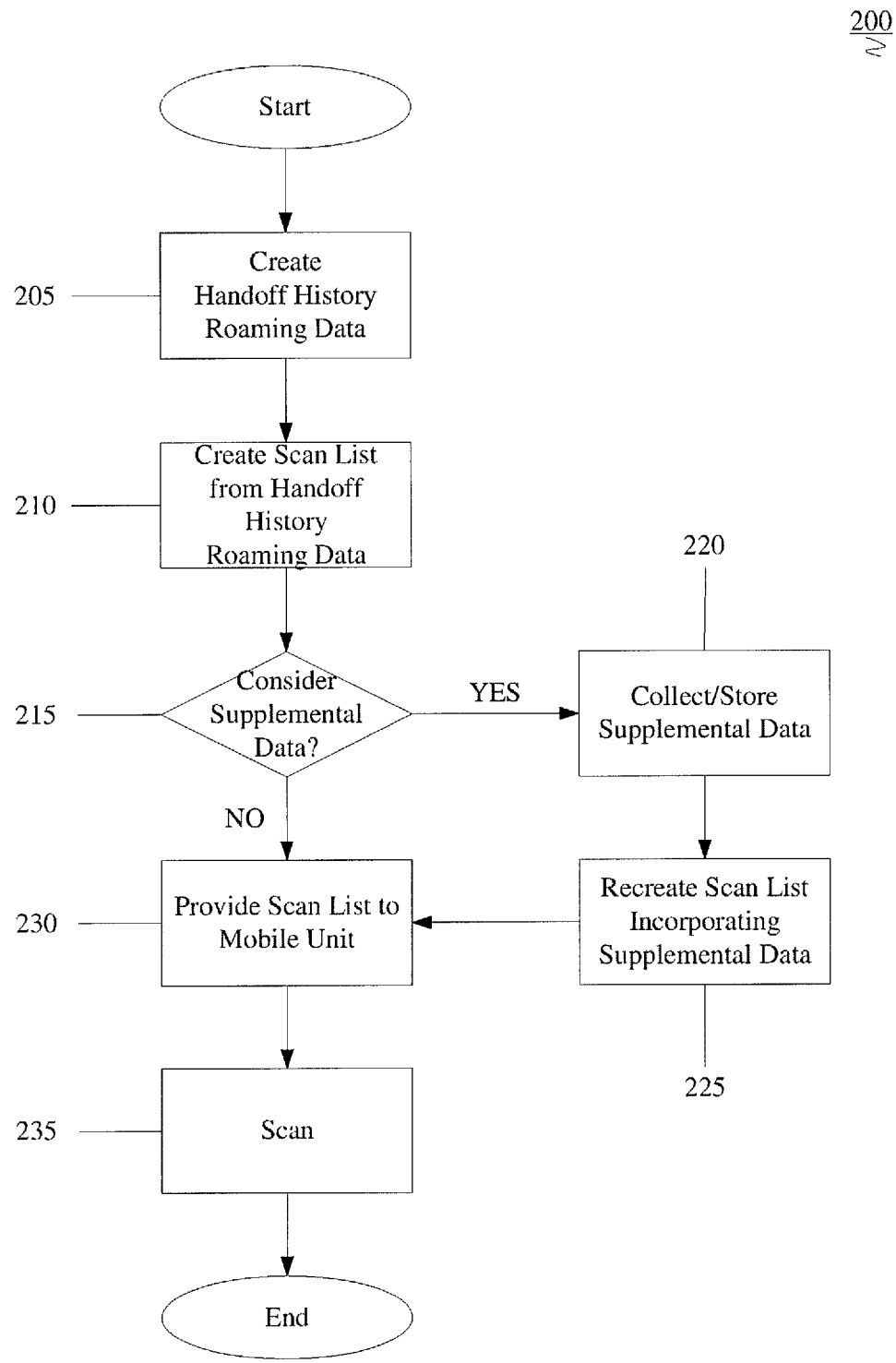
FIG. 2 shows an exemplary method of adaptively scanning access points when a mobile unit roams according to the present invention.

FIG. 2 shows an exemplary method 200 for adaptive location based roaming according to the present invention. It should be noted that the method 200 will be described with reference to the components of the system 100 of FIG. 1. The method 200 involves using the roaming data that is stored within the system 100 (e.g., in a memory of an AP, in a database of a server, in memory of MU, etc.) to efficiently transfer connectivity (i.e., handoff) to the MU 60 as it roams from a coverage area of one AP to another AP. As described above, the exemplary method 200 may be implemented within any wireless network architecture, such as, for example, as a wireless local area network ("WLAN"), a wireless personal area network ("WPAN") (e.g., Bluetooth, ZigBee), etc.

In step 205, the handoff history roaming data is created. As described above, the handoff history is a cumulative total of handoffs of MUs between APs. The history may be for all MUs, a particular MU or defined groups of MUs. Thus, step 205 is an ongoing process as each MU roam may be added to the handoff history. In this exemplary embodiment, the standard of an overall AP to AP handoff history will be used. Moreover, the handoff history is for the entire coverage area of the AP 10 and is not broken down into, for example, sectors as shown in FIG. 3.

Figure 4:
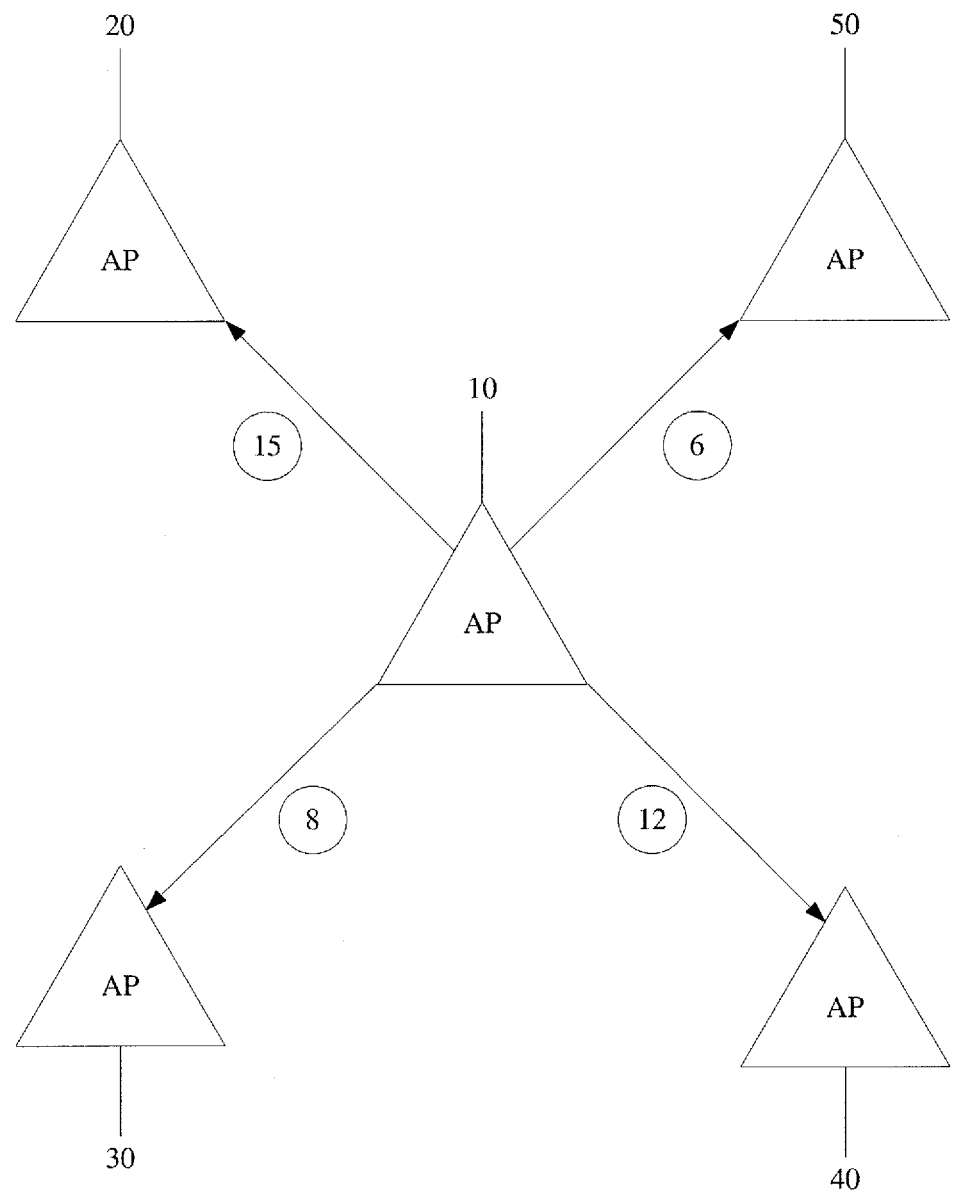
FIG. 4 shows an exemplary diagram of a handoff history for a roaming mobile unit according to the present invention.

FIG. 4 shows a diagram of the handoff history of AP 10 to the other APs 20-50. Thus, in this example, AP 10 has handed off 15 MUs to AP 20, 8 MUs to AP 30, 12 MUs to AP 40, and 6 MUs to AP 50. Those skilled in the art will understand that this history is for a singular point in time and that the next handoff by the AP 10 to another AP 20-50 will change this history. As described above, this roaming data may be stored in the AP 10 or in some other network device (e.g., NMA 90, server 70, etc.).

In step 210, a scan list (e.g., a channel scan list) is created for the possible APs to which the MU 60 may roam based on the handoff history roaming data. The scan list is prioritized to give the MU 60 a scanning order of the APs when the MU 60 roams. FIG. 5 shows the scan order based on the handoff history shown in FIG. 3. Furthermore, FIG. 5 includes a Target AP Priority associated with each target AP, as well as the handoff weight for each target AP. It should be noted that a Target AP Priority of "1" is the highest priority while a Target AP Priority of "4" is the lowest priority. According to FIG. 5, the AP 20 that received the most handoffs from the AP 10 is the first AP on the scan list. By prioritizing the available APs, the time required for the MU 60 to associate with the roamed AP from the starting AP is decreased, thereby minimizing dropped packets or connections. The prioritization scheme provides the adaptive transfer method for the MU 60. It should be noted that the entire handoff history may be used to determine a prioritization scheme or only appropriate sections of the handoff history may be used. As described above, the creation of the scan list may include the use of an apriori algorithm as a function of the roaming data.

In step 215, the method 200 determines if supplemental data is considered for further prioritization of the scan list. It should be noted that the supplemental data may not be used, thereby the method 200 continues to step 230. However, if supplemental data is used, the method 200 continues to step 220.

In step 220, any supplemental data may be collected and/or stored. As described above, the supplemental data may be data such as location data that is stored along with the handoff history. For example, when an MU roamed from AP 10 to AP 20 (e.g., one of the 15 roams illustrated in FIG. 4), the AP 10 may record the last location within the coverage area of AP 10 before the MU roamed. Thus, the supplemental data may be collected and stored at the same time as the handoff history data. In another example, the supplemental data may be collected later in the process. For example, as described above, the MU 60 may collect real time data such as RSSI data from the potential APs to which the MU 60 may roam. Thus, where the supplemental data is real time data, the step 225 (e.g., the collection of supplemental data) may occur later in the process. It should be noted that the supplemental data may be collected and/or stored prior to the scan list creation in step 210. In addition, those skilled in the art will understand that the supplemental data may be collected at various times in the process including at multiple times.

In step 225, the scan list is recreated incorporating the supplemental data. The supplemental data may be used to refine the scan list generated by the handoff history alone. For example, the handoff history data may be supplemented with additional data such as traffic data of the available APs. The traffic data may provide connectivity data for each available AP. The connectivity data may incorporate information that affects the association procedure for the MU 60, for example, a number of other MUs currently communicating with a particular AP, an available processing ability of a particular AP, etc. In another example, the handoff history may be supplemented with location data of the MU 60. The location data may also affect the association procedure for the MU 60 as further APs from the MU 60 location may be incapable of association.

In a further exemplary embodiment, the data referred to herein as supplemental data may be used as the sole or primary roaming data to generate the scan list. The supplemental data may be primary if, for example, a new MU or AP is introduced into the network and a handoff history is nonexistent. For example, in conjunction with network topology data, the location data of the MU 60 may provide proximity data on which coverage areas of APs are near the current location of the MU 60. The proximity data may be ascertained using conventional distance calculating algorithms. These algorithms may be executed on a processor located in, for example, the server 70, the NMA 90, a particular AP, etc. The AP with the closest coverage area to the MU may be given a higher priority than an AP with the further coverage area.

Those skilled in the art will understand that the various prioritization schemes may all be incorporated to provide the most efficient association procedure for the MU 60. It should be noted that incorporation of various prioritization schemes decreases the time necessary for the MU 60 to associate with the roamed AP compared to associating the MU 60 without one (e.g., as done in conventional technologies). For example, if a particular AP cannot support a further MU, the MU 60 should not attempt to associate with that particular AP. The prioritization scheme would dictate that the particular AP should be demoted towards the bottom of the scan list where an attempt to associate is highly unlikely. In contrast, conventional technologies with no prioritization scheme may attempt an association despite its futility.

In step 230, the created scan list from either step 210 or step 225 is provided to the mobile unit. Depending on the network component that creates/stores the scan list, that component provides the scan list to the MU 60. As previously described, the MU 60 will use the scan list when it needs to roam from a current AP to another AP. In one exemplary embodiment, when the MU 60 initially associates with an AP (e.g., AP 10), the AP may forward a current scan list to the MU 60. Thus, if and when the MU 60 needs to roam from AP 10 to another AP, the MU 60 will have the scan list. In other exemplary embodiments, the AP 10 may forward the scan list to the MU 60 at any time when the MU 60 is associated with the AP 10. In further exemplary embodiments, the MU 60 may retain the scan list for AP 10 in memory after the MU 60 has roamed from the coverage area of AP 10. Thus, when MU 60 roams back into the coverage area of AP 10, only updates to the scan list need to be sent rather than an entirely new scan list.

Where the created scan list is stored remotely from the AP, the scan list may be accessed via network 75. For example, the NMA 90 may access a handoff history roaming data that is stored in the database 80 of the server 70. The NMA 90 may also access supplemental data stored in its own memory. Thus, the NMA 90 may create or receive the scan list. The resulting scan list is provided by the NMA 90 to the MU 60 via the corresponding AP. In another example, the NMA 90 or the AP 10 may provide the handoff history roaming data and the supplemental data to the MU 60. The MU 60 may then create the scan list. In yet another example, creating the scan list from handoff history roaming data (i.e., step 210) may be performed by the NMA 90 while the incorporation of supplemental data to recreate the scan list (i.e., step 225) may be performed by the MU 60.

In step 235, the MU 60 scans the APs according to the created scan list. Those skilled in the art will understand that since the prioritization scheme decreases association time for the MU 60, it is implied that there is a greater probability that the MU 60 completes the association procedure using the higher prioritized APs. This provides other subsequent advantages. For example, the MU 60 reduces power consumption, reduces processor usage, etc.

The method 200 may end once the MU 60 performs the scan and roams into the roamed AP. However, the method may contain further steps. For example, the method may relocate the MU 60 after it has roamed. The relocation step may be done each time the MU 60 exits the coverage area of the starting AP (e.g., AP 10) and enters the coverage area of the roamed AP (e.g., one of APs 20-50). This corresponds to the roaming data discussed above. An updating step may follow the relocation step where, for example, a new entry is entered in the handoff history. For example, upon the MU scanning at step 235, the method 200 may return to step 205.

The method 200 may also include steps that prepare the APs prior to the MU 60 roaming. For example, the MU 60 may be pre-authenticated at APs to which the MU 60 may roam. According to the exemplary system of FIG. 1, once the MU 60 is authenticated by the AP 10, the authentication data may be transmitted to the other APs (e.g., APs 20-50). The transmission of authentication data may also be based on the handoff history roaming data and/or supplemental data. That is, higher prioritized APs (e.g., APs to which the MU 60 predominantly roams) may be provided the authentication data. Thus, when the MU 60 attempts to associate with a roamed AP that already has the authentication data, the authentication procedures may be bypassed, thereby further decreasing roam time.

Those skilled in the art will understand that the above described exemplary embodiments may be implemented in any number of manners, including, as a separate software module, as a combination of hardware and software, etc. For example, the roaming data may be incorporated in a program containing lines of code that, when compiled, may be executed on a processor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method executing on a processor of a device operating in a communications network, the method comprising:
   collecting roaming data for a the communications network, the roaming data comprising a number of times a mobile unit roams between a plurality of access points in the communications network;
   creating a scan list based on the roaming data, the scan list including a prioritization of the plurality of access points for roaming;

collecting location data based on a location of the mobile unit relative to at least one access point in the plurality of access points; and incorporating the location data into the scan list to generate a refined scan list having a modified prioritization of the plurality of access points for roaming; and transmitting the refined scan list to the mobile unit;

wherein the roaming data is a handoff history, the handoff history recording occurrences of associations, further the handoff history is based on one of the mobile unit, a plurality of mobile units of the network, and a specified group of mobile units of the network.

2. The method of claim 1, wherein the roaming data includes a priori data.

3. The method of claim 2, wherein the creating step includes the subset of generating the scan list using an a priori algorithm as a function the roaming data.

4. The method of claim 1, further comprising:
collecting supplemental data; and
recreating the scan list based on at least one of the roaming data and the supplemental data.

5. The method of claim 4, wherein the supplemental data is one of network topology data, location data, signal strength, overall coverage area data, sectored coverage area data, and network traffic data.

6. The method of claim 1, wherein the handoff history is recorded according to one of an overall duration, a time of year duration, and a time of day duration.

7. The method of claim 1, wherein the handoff history is based on one of the plurality of access points.

8. The method of claim 1, further comprising:
storing the roaming data at one of a database, a server, and a network management arrangement.

9. The method of claim 1, further comprising:
authenticating the mobile unit using authentication data with a first access point of the plurality of access points.

10. The method of claim 9, wherein the authentication data is transmitted by the first access point to other access points of the plurality of access points.

11. The method of claim 10, wherein the transmission of the authentication data is based on the roaming data.

12. The method of claim 1, further comprising:
updating the roaming data upon the mobile unit roaming.

13. A system having a plurality of devices operating in a communications network, the system comprising:
a collection module collecting roaming data for a network, the roaming data comprising a number of times a mobile unit roams between a plurality of access points in the network and location data of a mobile unit based on a location of the mobile unit relative to at least one access point in the plurality of access points of the network;
a creation module creating a scan list based on the roaming data, the scan list including a prioritization of the plurality of access points for roaming and incorporating the location data into the scan list, to generate a refined scan list having a modified prioritization of the plurality of access points for roaming; and
a transmitter transmitting the refined scan list to the mobile unitl;
wherein the roaming data is a handoff history, the handoff history recording occurrences of associations, further
the handoff history is based on one of the mobile unit, a plurality of mobile units of the network, and a specified group of mobile units of the network.

14. The system of claim 13, a wherein the roaming data includes a priori data and wherein the creation module generates the scan list using an a priori algorithm as a function the roaming data 15. The system of claim 13, further comprising:
the collection module collecting supplemental roaming data; and
the creation module recreating the scan list based on at least one of the roaming data and the supplemental roaming data.

16. The system of claim 15, wherein the supplemental data is one of network topology data, location data, signal strength, overall coverage area data, sectored coverage area data, and network traffic data.

17. The system of claim 13, further comprising:
a memory storing the roaming data.

18. The system of claim 13, further comprising:
an authentication module authenticating the mobile unit using authentication data with a first access point of the plurality of access points.

19. The system of claim 18, further comprising:
an access point transmitter transmitting the authentication data other access points of the plurality of access points.

20. The system of claim 19, wherein transmission of the authentication data is based on the roaming data.

21. The system of claim 13, further comprising:
an updating module updating the roaming data upon the mobile unit roaming.

22. A system having a plurality of devices operating in a communications network, the system comprising:
a collection means for collecting roaming data for a network, the roaming data comprising a number of times a mobile unit roams between a plurality of access points in the communications network;
a creation means for creating a scan list based on the roaming data, the scan list including a prioritization of a the plurality of access points for roaming;
a collection means for collecting location data based on a location of a the mobile unit relative to at least one access point in the plurality of access points; and
a means for incorporating the location data into the scan list to generate a refined scan list having a modified prioritization of the plurality of access points for roaming; and
a transmittal means transmitting the refined scan list to the mobile unit;
wherein the roaming data is a handoff history, the handoff history recording occurrences of associations, further
the handoff history is based on one of the mobile unit, a plurality of mobile units of the network, and a specified group of mobile units of the network.

* * * * *